March 19, 1935.  J. INGRAM  1,995,100

VALVE STEM ASSEMBLY

Filed Sept. 11, 1934

Inventor

John Ingram,

By *Clarence A. O'Brien*
Attorney

Patented Mar. 19, 1935

1,995,100

UNITED STATES PATENT OFFICE 1,995,100

VALVE STEM ASSEMBLY

John Ingram, Clarkelen, Wyo., assignor of one-third to C. M. Renyolds, Savageton, Wyo.

Application September 11, 1934, Serial No. 743,581

2 Claims. (Cl. 152—12)

This invention relates to a valve stem assembly to be embodied in tires and the like, the general object of the invention being to provide a simple form of device in which the air pressure tends to hold the valve closed and which eliminates the internal threaded parts of the tubes or valve assembly and the rubber portions thereof.

This invention also consists in certain other features of construction and in the combination and arrangement of several parts, to be hereinafter fully described, illustrated in the accompanying drawing and specifically pointed out in appended claims.

In describing the invention in detail, reference will be had to the accompanying drawing wherein like characters denote like or corresponding parts throughout the several views, and in which:—

Figure 1:
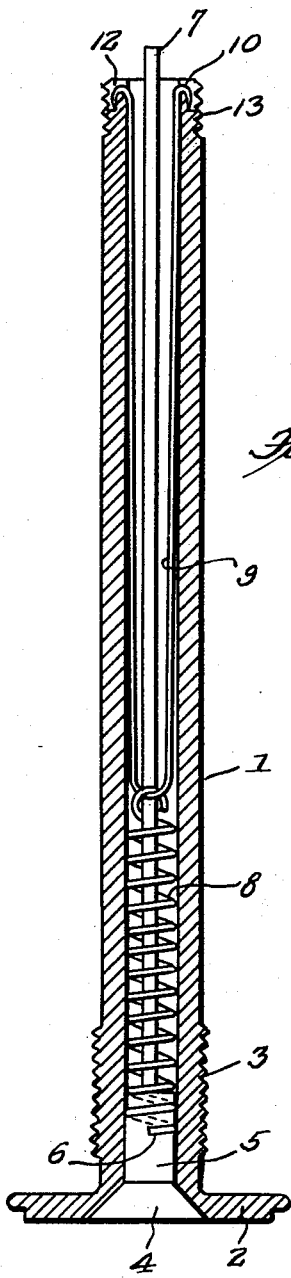
Figure 1 is a longitudinal sectional view through the improved valve assembly.
Figure 2:
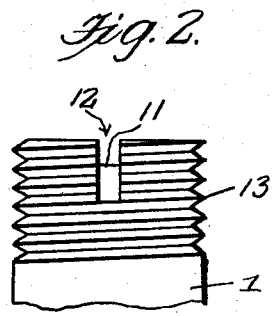
Figure 2 is a fragmentary view taken at right angles to Figure 1 and showing the notches in the outer end of the stem.
Figure 3:
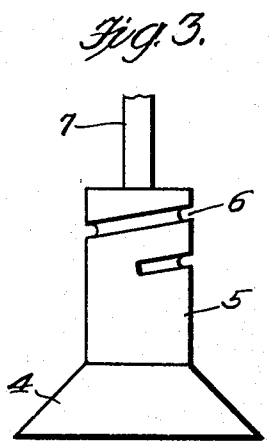
Figure 3 is a view of the valve member with the spiral grooves therein for receiving the lower end of the spring.

In this drawing, the numeral 1 indicates the tubular stem which is provided with the base part 2 and a threaded portion 3, these portions acting to hold the stem in the tube and rim in the usual manner. A valve seat of tapered formation is formed at the lower end of the stem to be engaged by the substantially frustro-conical valve 4 which has a cylindrical part 5 at its outer and small end which is formed with the spiral groove 6. The stem 7 is connected with this part 5 at the center thereof and is long enough to project from the outer end of the stem so that the stem 7 can be pressed upon to force the valve 4 off of its seat when the tube is to be deflated. A coil spring 8 has one end threaded in the groove 6 and the other end engages the bight of a U-shaped member 9 which has hooks 10 at its ends which engage projections 11 formed by notches 12 in the outer end of the stem 1 as shown in Figure 1. The outer end of the stem 1 is threaded as shown at 13 to receive the usual cap.

As it will be seen the U-shaped member 9 acts as an anchor for the spring, said spring acting to hold the valve upon its seat and due to the formation of the valve and its seat the air pressure in the tube acts to hold the valve upon the seat. The valve can be forced off the seat by depressing the stem 7 by hand or by the usual chuck when the tire is being inflated.

As it will be seen this valve eliminates the internal threaded part of the stem as well as the rubber part now in use so that this improved stem will last much longer than the stems now in use and it will hold the pressure in the tire much longer so that it is not necessary to inflate the tire as frequently as with the devices now in use.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A valve stem assembly comprising a tubular stem having a valve seat at its inner end, a valve engaging the seat, a stem connected with the valve and projecting from the outer end of the tubular stem, a spring connected with the valve, and a member supported on the outer end of the tubular stem and engaging the spring.

2. A valve stem assembly comprising a tubular stem having a valve seat at its inner end, a valve engaging the seat and having a cylindrical portion formed with a spiral thread, a spring having one end threaded to said threaded part, a stem connected to the threaded part and extending from the outer end of the tubular stem and U-shaped member having its bight connected with the spring and provided with hooks at its ends engaging over projections formed by notches in the outer end of the tubular stem.

JOHN INGRAM.